(12) United States Patent
Kelsey

(10) Patent No.: X5206
(45) Date of Patent: Aug. 26, 1828

(54) BEES, MANAGEMENT OF

(76) Inventor: Francis Kelsey

Francis Kelsey

Letters Patent.

The Schedule referred to in these Letters Patent and making part of the same, containing a description in the words of the said Francis Kelsey himself, of his improvement in the mode of Managing Honey Bees.

First. for the purpose of Separating a new Swarm of Bees from an old one, when sufficiently numerous. 1st. Raise the hive a little, and blow into the hive a small quantity of Smoke - Tobacco smoke being preferable which renders the bees docile and harmless so that they may be managed with perfect safety. 2nd. Remove the hive from the flooring or other place on which it stands. turn it bottom upwards upon the ground - place a Sheet or other cloth, and a sufficient thickness of cloths to render the hive dark over the hive - a slight hammering or thumping is then to be made upon the ends of the sticks which run thro' the hive which will start the bees from the centre of the hive, when the hammering is to be continued upon and about the hive near the ground. The Bees will by this means be driven to the top & attach themselves to the sheet. The Sheet is then to be quietly raised from the centre of the hive. The Sheet to be raised from the hive slowly and gradually and as fast as the bees will follow it up, the hammering upon the hive to be continued. The bees in 10 or 15 minutes will nearly all be attached to the sheet when it is to be removed entirely from the hive and spread upon the ground - one end of the sheet to be raised upon a block or other substance about one foot high. 3rd. Place an empty hive upon the raised part of the sheet on the blocks. - place a few Bees near the empty hive, they will run into the hive and their noise will attract the others - They then are to be allowed to run into the empty hive until a sufficient portion of them have taken possession of the new hive and until the Queen Bee is discovered if practicable - The Bees are to be made to pass into the new hive slow, by removing the hive a proper distance from them which affords a better opportunity of discovering the queen Bee. They may also be made to go slow by partly covering them with a cloth. The queen Bee may be known by the darkness of her colour and the brisk movement of the other Bees about her, and the slowness of her movements: 4th If too great a proportion of the Bees should have passed into the new hive the queen is to be taken and safely kept until the swarm can be separated and properly apportioned; When the queen is to be returned to the new hive. 5th The remainder of the Bees are to be returned to the old hive where they will provide themselves with another queen Bee. 6th After the swarms are properly apportioned, the hives are to be placed upon their stand when both swarms will commence the labours of the season.

Second method of separating swarms of Bees as invented and discovered by Francis Kelsey. The hives are all to be made of a size and of inch boards and about twelve inches square is preferable for size. two sticks are to be put each way thro the hive near the centre - slats are to be put under and near the top board within half an inch of each other - Sometime before the hive shall be filled by a swarm of Bees, another hive of the same size is to be placed under it without a top board but with slats. The comb will be fastened to the slats. When the lower hive is full they are to be separated, when the under hive is to have a top board fastened by cletes attached to it. The cletes to run one and a half or two inches above the side boards the better to accommodate another hive. This process may be continued from time to time as may be deemed necessary. The first of the above methods is preferable - The honey may be taken from the hives by either of the above modes, either by removing a part of the honey and dividing the Bees as above described or by placing all the bees in the new hive and removing all the honey -

Witnesses
H. Gardner
[illegible]

Francis Kelsey

[illegible]